United States Patent [19]

Nansel

[11] 4,454,768
[45] Jun. 19, 1984

[54] FLUID FLOW CONTROLLER

[75] Inventor: Harold K. Nansel, Waverly, Nebr.

[73] Assignee: Emhart Industries, Inc., Indianapolis, Ind.

[21] Appl. No.: 360,322

[22] Filed: Mar. 22, 1982

[51] Int. Cl.³ .............................................. G01F 1/28
[52] U.S. Cl. ............................. 73/861.76; 200/81.9 R
[58] Field of Search ...................... 73/861.75, 861.76; 116/112, 275; 200/81.9 R; 340/610

[56] References Cited

U.S. PATENT DOCUMENTS

| 384,570 | 6/1988 | Grovesteen et al. | 116/112 X |
| 659,855 | 10/1900 | Meloon | 200/81.9 R X |
| 2,001,168 | 5/1935 | Turner | 200/81.9 R |
| 2,238,327 | 4/1941 | Jackson et al. | 200/81.9 R |
| 2,276,100 | 3/1942 | Scholin | 200/81.9 R |
| 2,966,133 | 12/1960 | Hube | 73/861.76 X |
| 3,845,259 | 10/1974 | Spurr | 73/861.76 X |

Primary Examiner—Charles A. Ruehl
Attorney, Agent, or Firm—Robert F. Meyer

[57] ABSTRACT

A pivotal shaft is connected to an actuator with the actuator being pivotally mounted with one end extending into a conduit and the other end being pivotally connected to the shaft. Actuation of the actuator through fluid flow causes the shaft to pivot and, if desired, causes actuation of a switch.

The pivotal shaft is carried in a housing which has an opening connected to an opening in the conduit. The actuator is pivotally mounted within the housing opening where a dam is provided to substantially prevent bypass of water through the housing around the actuator to provide better and more reliable actuation force.

4 Claims, 2 Drawing Figures

FLUID FLOW CONTROLLER

SUMMARY OF THE INVENTION

The present invention relates to a mechanism for detecting flow in a fluid carrying conduit which, in general, comprises a housing adapted for securement to the conduit in overlying sealing relationship to an opening to the conduit, flow detecting means adapted for insertion in the conduit and shiftable in response to fluid flow therethrough including a reactor member extending into the housing, first pivot means providing a first pivot point for the reactor member, an actuator means pivotally connected to the reactor member, and second pivot means providing a pivot point for the actuator.

The invention also contemplates that the actuator be pivotally mounted in an opening of the housing where a dam is provided to prevent fluid flow from bypassing the actuator.

BACKGROUND OF THE INVENTION

The present invention pertains to a flow detecting mechanism and, more particularly, to a flow detecting mechanism useful for operating other mechanisms such as a switch.

Flow responsive switch mechanisms of the type referred to have many varied applications for sensing and controlling flow in fluid carrying apparatus as well as operating associated structure in response to the presence or absence of fluid flow. Many such switches now available sense fluid flow by movement of a vane or like detector disposed in a fluid carrying conduit. Physical movement of the detector is accomplished either directly by fluid flow impinging thereon or by use of structure such as orifices, blades or turbines in the conduit that creates a pressure differential which causes shifting of the detector. This physical movement must then be transmitted externally of the conduit to operate a switch, usually electrical, to indicate the presence of flow.

A typical example of such flow responsive switch mechanisms is that described in U.S. Pat. No. 3,845,259 issued Oct. 29, 1974. As described in this patent, a shaft pivots at a single point in response to a fluid flow to actuate a switch. This type of device has been shown to be useful when detecting flow in pipes of a relatively large diameter, for example, diameters of greater than 2". However, it has been found that with only a single pivot point, sufficient force cannot be generated when detecting flows in pipes having a diameter from $\frac{3}{4}$ to $1\frac{1}{2}$". It has also been found that with the smaller diameter pipes, the fluid flow has tendency to bypass the actuator thus making it more difficult to pivot the shaft and actuate a switch.

OBJECTS OR FEATURES OF THE INVENTION

Accordingly, it is a feature of the present invention to provide a flow detecting mechanism that is particularly useful for use in conduits of smaller diameter. Another feature of the invention is to provide such a mechanism having a flow detecting means composed of an actuator which includes two members, each of the members having a pivoting axis and wherein the pivoting members are pivotally joined together. Yet another feature of the invention is to provide such a mechanism wherein the pivoting member which extends into the conduit is pivotally mounted in such a manner as to substantially prevent fluid flow from bypassing the actuator.

These and other features of the invention will become apparent from the following description taken in conjunction with the accompanying drawings.

DETAILED DESCRIPTION OF THE DRAWINGS

Figures 1, 2:
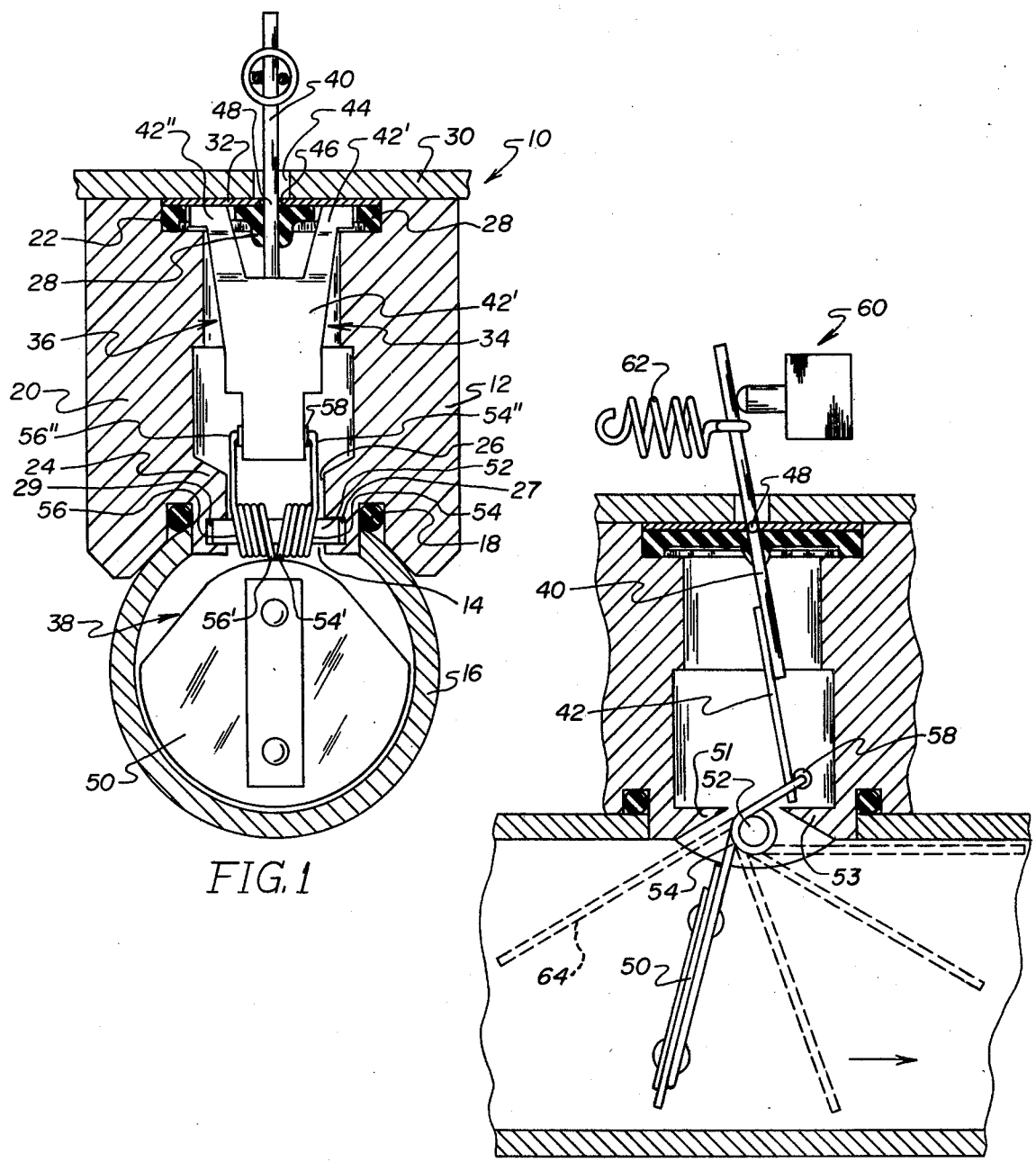
FIG. 1 is a side view taken in section showing the flow detecting mechanism employing the features of the invention in combination with a conduit through which a fluid may flow.
FIG. 2 is a view similar to FIG. 1 showing another side elevation of the mechanism in conjunction with a conduit.

Referring now to the drawings, there is shown a flow detecting mechanism 10 which is enclosed in a housing 12 that is adapted to be connected to an opening 14 of conduit 16 through seals 18 in a manner well known in the art. The housing 12 is comprised of a cup-shaped member 20 having an open end 22 and a base 24 having opening 26 therein. The opening 22 is closed by a resilient member 28 which forms a tight seal with the housing. A rigid plate 30 holds seal 28 and backup plate 32 in place.

According to the invention, there is provided a flow detecting means 34 which is particularly adaptable for responding to fluid flow in conduit 16. Detecting means 34 includes a reactor member 36 and an actuator means 38. Reactor member 36 includes a shaft 40 and a rigid arm 42 which is fixed to the shaft. As is completely described in the above noted U.S. Pat. No. 3,845,259, shaft 40 extends through apertures 44 of plate 30 and 46 of backup plate 32 and is held in a seal tight relation with resilient member 28. As is further described in U.S. Pat. No. 3,845,259, shaft 40 is made to pivot about point 48 through the pivoting of the distal ends 42' and 42" engaging grooves in backup plate 32.

Actuator means 38 includes a paddle 50 that is carried in conduit 16 and is pivotally mounted on pin 52 through coil springs 54 and 56. More specifically, the distal ends 54' and 56' are connected to the paddle 50. The reactor member and the actuator means are pivotally connected together through the other ends 54" and 56" being connected to or engaged with a sleeve 58 carried on the arm 42 of the reactor member.

As shown, pin 52 is fixedly held in line with the opening 26 through cylindrical notches 27 and 29 and in conjunction with projections 51 and 53 provides a dam to substantially prevent bypass of water through the housing around the actuator to provide better and more reliable actuation force.

Referring in particular to FIG. 2, with a fluid flow in the direction indicated by the arrow, paddle 50 is forced counterclockwise about the pin 52 which in turn pivots arm 42 and thus shaft 40 in a clockwise direction to activate a switch means 60. When fluid flow in the conduit stops, there being no force acting on paddle 50, spring 62 causes shaft 48 to pivot clockwise to deactivate the switch 60 and return the paddle 50 to its "at rest" position 64 through the coil spring 54 and 56. The fact that the actuator means and the reactor member both have a pivot point requires less force to deactivate the switch 60 due to leverages therein.

What is claimed is:

1. A mechanism for detecting flow in a fluid carrying conduit comprising:
   (a) a housing adapted for securement to said conduit in overlying sealing relationship and having a first opening to a second opening to said conduit, said housing including opposed projections extending into said first opening to provide a dam means in said first opening, a pin carried by said housing and extending across said first opening between said projections, and
   (b) flow detecting means shiftable in response to fluid flow through said conduit, said flow detecting means including a reactor member extending into said housing, pivot means providing a pivot point for said reactor member and an actuator pivotally connected to said reactor member and pivotally carried by said pin and extending into said conduit.

2. A mechanism according to claim 1 wherein said actuator means includes a paddle means and a coil spring carried by said pin an end of which is connected to said paddle means, and an opposite end pivotally mounted on said reactor member.

3. A mechanism according to claim 1 wherein said reactor member includes a shaft extending into said housing, a rigid arm carried by said shaft and means at a distal end of said arm engaging said housing to provide said pivot point.

4. A mechanism according to claim 3 wherein said means at a distal end of said arm includes knife edges engaging a resilient member sealing said housing.

* * * * *